June 7, 1949.　　　　J. M. LANTZ ET AL　　　2,472,163
CONNECTING ROD ALIGNING JIG
Filed Jan. 30, 1946　　　　　　　　　　　2 Sheets-Sheet 1
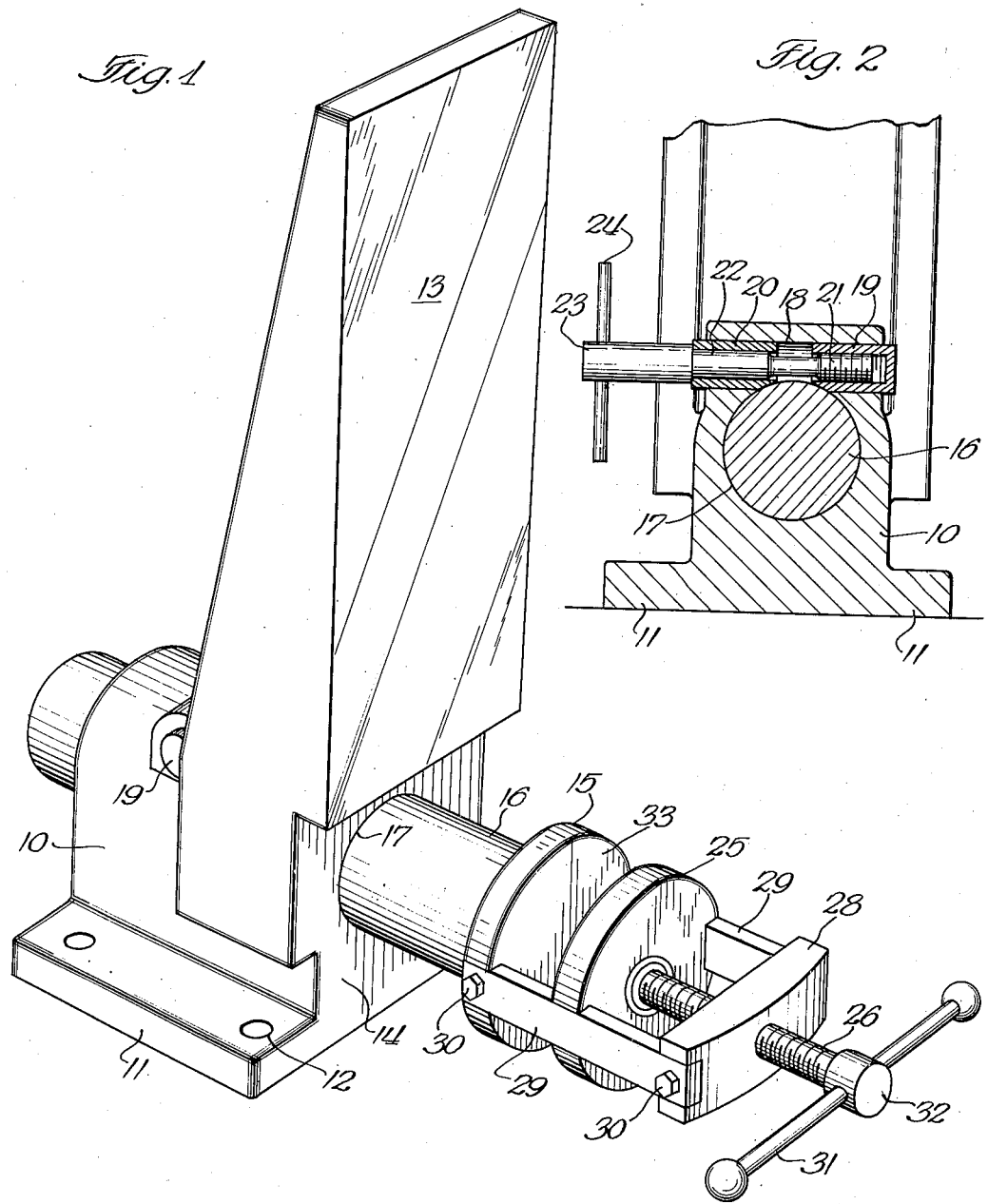
INVENTORS
Jewell M. Lantz
Edward R. Kerchal
BY
ATTORNEY June 7, 1949. J. M. LANTZ ET AL 2,472,163
CONNECTING ROD ALIGNING JIG
Filed Jan. 30, 1946 2 Sheets-Sheet 2
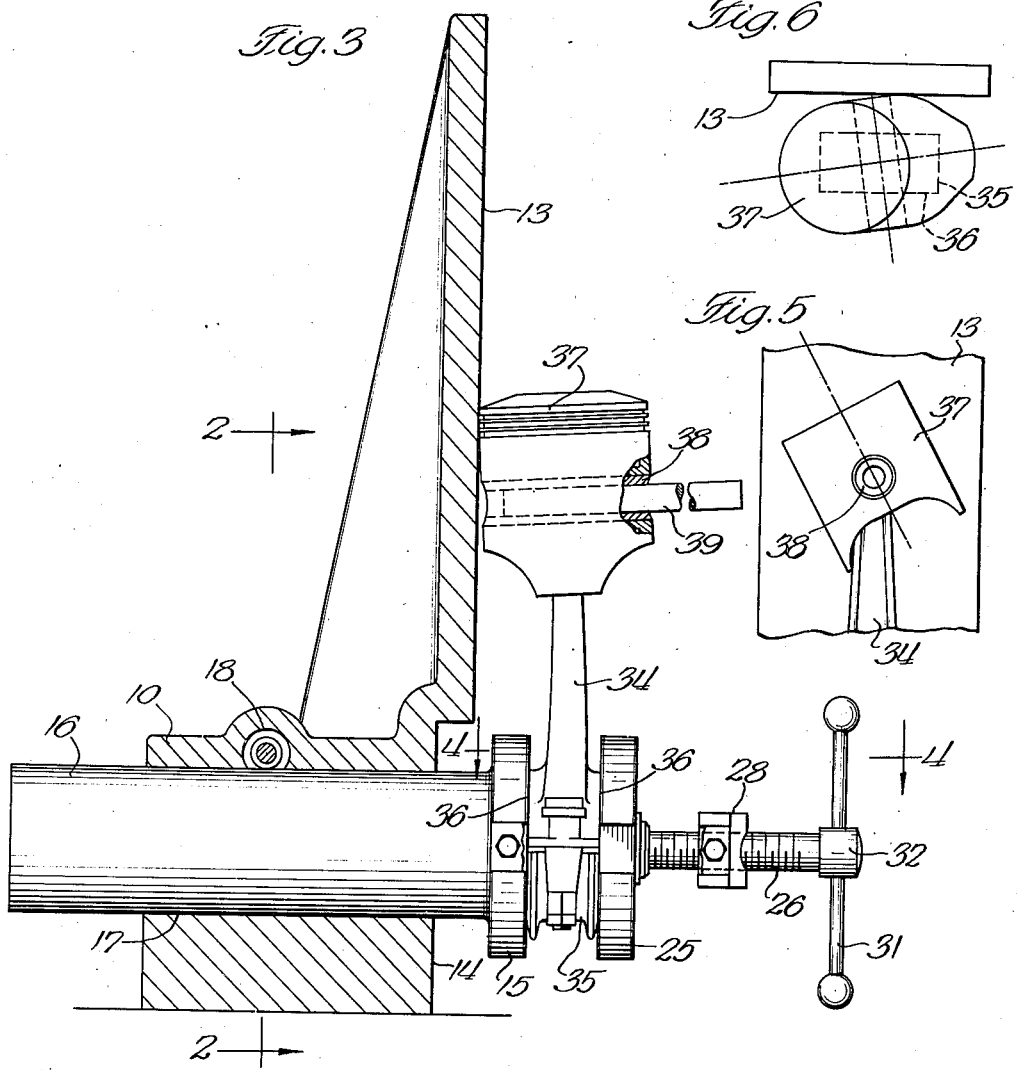

Patented June 7, 1949

2,472,163

UNITED STATES PATENT OFFICE 2,472,163

CONNECTING ROD ALIGNING JIG

Jewell M. Lantz, Oswego, and Edward R. Kerchal, Portland, Oreg.

Application January 30, 1946, Serial No. 644,225

3 Claims. (Cl. 153—32)

This invention relates generally to the automotive industry and particularly to a connecting rod aligning jig.

The main object of this invention is to provide a means whereby connecting rods may be tested for alignment and straightened within the testing means itself.

The second object is to provide an accurate and quick means for aligning rods, especially adapted to the modern type of connecting rods, wherein steel inserts are employed within the bearing members and wherein the lateral faces of the rods are surfaced.

The third object is to so construct a device that will lend itself to lateral as well as spiral corrections.

The fourth object is to so construct a device that a minimum amount of skill is required in order to produce a proper alignment.

These and other objects we accomplish in a manner set forth in the following specification as illustrated in the accompanying drawings, in which Fig. 1 is a perspective view of the device itself.

Fig. 2 is a transverse section taken along the line 2—2 in Fig. 3.

Fig. 3 is a longitudinal section through the device, showing a piston and rod being tested and aligned.

Fig. 4 is a fragmentary section taken along the line 4—4 in Fig. 3.

Fig. 5 is a fragmentary side elevation showing the rod being tested for twist.

Fig. 6 is a plan of Fig. 5.

Similar numbers of reference refer to the same or similar parts throughout the several views.

Referring in detail to the drawing there is shown a standard 10, whose flanges 11, are provided with holes 12 for bolts (not shown), whereby same may be fastened to a bench.

Rising from the standard 10 and integral therewith is a face plate 13, which is long enough to take in the longest connecting rod and piston, and preferably undercut to the face 14 of the standard 10, to make room for the table 15, formed on the ends of the spindle 16, which is slidable within an opening 17. The face plate 13 occupies a plane normal to the axis of the spindle 16. Extending through the standard 10 is an opening 18 which partly intersects the opening 17. Within the opening 18 are the sleeves 19 and 20. The sleeve 19 is threaded to receive the binding screw formed on the stem 22, whose enlarged end 23 bears against the outer end of the sleeve 20, and is provided with a T handle 24. The corner of the sleeves 19 are cut away, as shown, to conform to the curvature of the spindle 16.

Opposed to the table 15 is a clamp 25, which is operated by a screw 26 through a slidable lever 27. A cross bar 28 is threaded to receive the screw 26, and it is slotted as are the members 15 and 28 to receive the bars 28, which are secured to the members 15 and 28 by means of the cap screw 30. The handle 31 extends through the head 32 of the screw 26. The purpose of the construction thus far described, is to provide a table 15 whose face 33 is parallel with the face plate 13, and adjustable with relation thereto under the control of the clamping screw 21.

In order to illustrate the purpose of this invention, there is shown a common form of connecting rod 34, whose bearing end 35 has its sides 36 faced and held between the members 15 and 25. There is also shown a common form of piston 37 which contains a tubular steel insert 38. Into the insert 38, is inserted a rod 39, which is actually a bending bar and is used to bend the connecting rod 34 while it is held between the members 15 and 25. In Fig. 3 it will be observed that the side of the piston 37, is out of alignment with the face plate 13. It will, therefore, be necessary to bend the piston 37 away from the face plate 13. Any other desired correction may also be made, whether it be lateral or longitudinal or a compound of both, the object being to apply the corrective action while the rod is held within the testing jig.

It is a well known fact, for example, that numerous devices have been constructed in which the rods are tested by means of one instrument and corrected while held by means of another instrument, thereby paving the way for error in correction and at the same time, requiring the expenditure of a great deal of time.

While we have thus illustrated and described our invention, it is not our desire to be limited to the precise form shown herein, and we intend to cover such forms and modifications of the invention as fall fairly within the appended claims.

We claim:

1. A device of the class described, having a combination of a standard having a face plate mounted thereon, a slide mounted in said standard normal to the plane of the face plate, a vise mounted on said slide having opposed faces parallel to the plane of the face plate adapted to receive the bearing end of a connecting rod between said opposed faces and means for holding said slide in a predetermined position.

2. A device of the class described, having a combination of a standard having a face plate mounted thereon, a spindle slidably and rotatively mounted in said standard, the axis of which is normal to the surface of said face plate, means for releasably holding said spindle in a fixed relation to said standard, a vise mounted on said spindle adapted to hold the bearing end of a connecting rod within same normal to said axis while the piston on said connecting rod is opposed to said face plate and means for bending said rod while mounted in said vise.

3. A connecting rod aligning jig consisting of an upright face plate adapted to be mounted on a bench, a spindle slidably and rotatably mounted in said face plate, means for clamping said spindle with relation to said face plate, a vertical table mounted on said spindle, a cross bar in front of said table, guide bars connecting said table and cross bar, a clamp between said table and bar guided on said guide bars and a screw passing through said bar into said clamp whereby a bushing of a connecting rod may be held by engaging the ends of said bushing.

JEWELL M. LANTZ.
EDWARD R. KERCHAL.

REFERENCES CITED

The following references are of record in the file of this patent:

UNITED STATES PATENTS

| Number | Name | Date |
|---|---|---|
| 1,284,592 | Carlson | Nov. 12, 1918 |
| 1,514,025 | Stensrud | Nov. 4, 1924 |
| 1,603,070 | Cox et al. | Oct. 12, 1926 |
| 2,016,463 | Sunnen | Oct. 8, 1935 |